United States Patent

Bona et al.

[11] Patent Number: 4,796,927
[45] Date of Patent: Jan. 10, 1989

[54] MOBILE JOINT FOR CONNECTORS

[75] Inventors: Alfredo D. Bona, Abbiategrasso; Attilio Airaghi, Cornaredo, both of Italy

[73] Assignee: Murray Europe S.p.A., Milan, Italy

[21] Appl. No.: 63,006

[22] Filed: Jun. 15, 1987

[30] Foreign Application Priority Data

Nov. 3, 1986 [IT] Italy .................. 23573/86[U]

[51] Int. Cl.⁴ .............................................. F16L 27/08
[52] U.S. Cl. ................................. 285/190; 285/382.4
[58] Field of Search ............... 285/190, 382.4, 382.5, 285/174

[56] References Cited

U.S. PATENT DOCUMENTS 2,273,396  2/1942  Couty .......................... 285/382.4 X
3,145,035  8/1964  Hanback ........................ 285/190 X
3,841,667  10/1974  Sunds .......................... 285/382.4 X

FOREIGN PATENT DOCUMENTS 1064041  5/1954  France ......................... 285/190
2171770  9/1986  United Kingdom ................. 285/174

Primary Examiner—Dave W. Arola
Attorney, Agent, or Firm—Bucknam and Archer

[57] ABSTRACT

Mobile joint for connectors including a central body (1) having a compartment (2) into which converge the two tubes (3, 4) to be connected, fixed to the central body, and a hollow bolt in the duct (6) of which is inserted one (4) of the tubes which is ensured by means of a drawing die for enlarging (15).

The seals are guaranteed by means an annular elastic gaskets (11, 12) arranged in cavities (10, 13) machined respectively on the upper surface (9) and the lower surface (14) of the bolt head (7).

4 Claims, 1 Drawing Sheet

U.S. Patent
Jan. 10, 1989
4,796,927
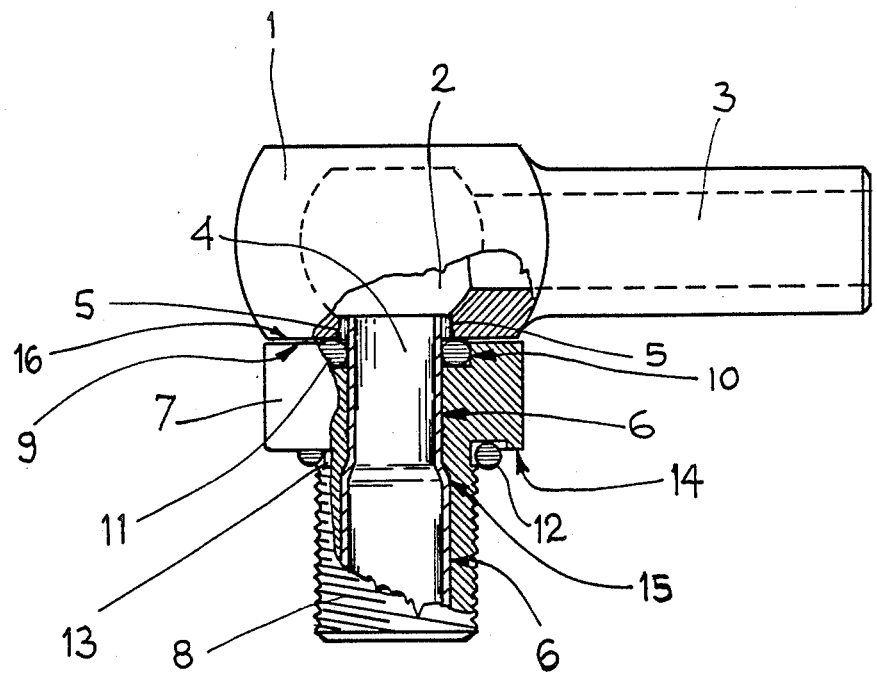

MOBILE JOINT FOR CONNECTORS

BACKGROUND OF THE INVENTION

1. Field of the invention

This invention relates to a mobile joint for connectors. To be more precise, this invention concerns a mobile joint for connectors, which may be used for conveyor ducts for fluids, especially for those at low pressure.

2. Description of the prior art

It is known, in industry in general, and especially in the car industry, that very often use is made of connectors with joints of the so-called 'eye' type to connect conveyor ducts for fluids in general, and in particular, for those subject to low working pressures. Though the above mentioned connectors are on the most part satisfactory because they serve their purpose adequately, nonetheless, they have certain drawbacks. In particular, due to the fact that the jointing seal is ensured by two flattened washers of annealed copper, a high torque setting must be applied to obtain a perfect seal.

Another drawback is due to the fact that the so-called eye-joints are composed of various parts or pieces separated one from the other, such as a joint, bolt and washers, which must be assembled with care and kept in perfect alignment one with the other during closing. To obtain this result the assemblers must pay great attention, and consequently the entire operation takes quite a long time.

SUMMARY OF THE INVENTION

This invention solves the above-mentioned drawbacks by adopting a mobile joint in which all the constituent parts are inter-connected and are self-centered during working conditions. According to this invention, the mobile joint for connectors comprises:

(a) a central body provided with a compartment into which converge the two tubes to be connected, one of which forms an integral part of the central body and the other is fixed to the central body and is provided with an enlargement drawing in the part opposite the one which is fixed, (b) a hollow bolt inserted over the tube fixed to the central body, comprising a faceted head, a threaded part and a central duct equipped with an enlargement at its end, the bolt being inserted in such a way that the faceted head is in contact with the central body and the enlargement drawing of the tube perfectly matches the enlargement of the central duct, and (c) elastic annular gaskets set on the upper and lower surfaces of the faceted head.

In order that the elastic annular gaskets may be perfectly positioned, the bolt is provided with an upper annular compartment and a lower annular groove, facing the two free surfaces of its faceted head.

When drawing the tube in the central duct of the bolt, the elastic annular gasket, placed in the upper annular compartment, is compressed and placed in a condition to ensure the seal between the annular seat, the upper surface of the bolt head and the lower plane of the central body. In the joint referred to in this invention, the tube, fixed to the central body and inserted in the hollow bolt, allows the bolt to rotate but the bolt remains constrained to it due to the enlargement drawing; the elastic annular gasket, placed between the central body and the hollow bolt, ensures a perfect seal.

The advantages obtained by adopting the mobile joint referred to in this invention mainly consist of the fact that application of the connector joint no longer requires the use of a high torque setting; the self-centering and pre-assembling of the various parts comprising the joint facilitates the assembly operation and greatly reduces the time it takes to apply them; the seal between the various parts is guaranteed by the malleability, flexibility, adhesion and adaptability of the material which the annular gaskets are made of, the material being preferably elastomer.

BRIEF DESCRIPTION OF THE DRAWING

In order to have a clearer picture of the constructive and functional characteristics of this invention, following is a description with reference to the enclosed drawing which represents a schematic view of the cross-section of an embodiment of the mobile joint for connectors of the present invention.

DESCRIPTION OF THE PREFERRED EMBODIMENT

With reference to the drawing, the mobile joint for connectors comprises a main body 1 provided with an inner compartment 2 into which converge two tubes 3 and 4. The two tubes 3 and 4 are preferably arranged in such a way that their lengthwise axes are at a right angle. The tube 3 forms an integral part of the main body 1. The tube 4 is made up of a tubular body which is rigidly constrained to the main body 1, for example by means of soldering around its circumference 5. The extension of the tube 4 is inserted into a central duct 6 of a bolt composed of an upper faceted head 7 and a lower threaded shank 8.

On the upper surface 9 of the head 7 is machined an annular chamber 10 in which is inserted an annular gasket 11. A second annular gasket 12 is placed in the groove made on the shank 8 of the bolt, between the lower surface 14 of the head 7 and the threaded part 8.

The bolt is free to rotate, but at the same time is constrained to the tube due to an enlargement drawing 15 which has the same widened shape as the lower part of the central duct 6. In this manner, the bolt 14, though it may rotate around its axis, still remains constrained to the tube and cannot be removed. Moreover, when assembling the tube 4 in the central duct 6, i.e. during drawing of the free end of the tube 4, the gasket 11 is compressed between its seat 10, the upper surface 9 of the bolt and the lower plane 16 of the main body 1, making a perfect seal, constraining the bolt to the tube 4.

The annular gaskets 11 and 12 are preferably, but not necessarily of the circular section type and are made of flexible, elastic material, such as, for example, an elastomer.

The enclosed description and drawing make it clear that all the components of the mobile joint referred to in this invention are pre-assembled all together and, for their installation, it is sufficient to screw the threaded shank 8 in the corresponding threaded hole from which it originates, or into which must be sent the fluid to be conveyed.

During the screwing process, all the components remain in their exact position of alignment and in the end the gasket 12 is also pressed between its groove 10, the lower surface 14 of the head 7 and the plane, not shown, to which the joint is constrained. Closing, at the base of the bolt, with a normal tightening load, completes the assembly and guarantees the perfect seal of the joint.

We claim:

1. A mobile joint for connecting two tubes (3 and 4) which comprises:
   (a) a central body (1) provided with a compartment (2), into which said two tubes (3, 4) converge, one (3) of said tubes being integral with said central body (1), the other tube (4) having two ends and being fixed to said central body (1) and being provided with an enlarged drawing die portion (15) in the end opposite to the end fixed to said central body;
   (b) a hollow bolt inserted over said tube (4) fixed to said central body (1), said bolt having a faceted head (7), a threaded part (8) and a central duct (6) provided with a wider portion at the end thereof, said bolt being inserted over the tube (4) whereby the faceted head (7) comes into contact with said central body (1) and said enlarged portion (15) of said tube (4) matches the widening of said central duct (6);
   (c) said faceted head having upper (9) and lower (14) surfaces, elastic annular gaskets (11, 12) arranged on the upper (9) and lower (14) surfaces of said faceted head (7), respectively, wherein said first annular gasket (11) is inserted into an annular seat (10) machined on said upper surface (9) of said head (7) and said second annular gasket (12) is inserted in a groove (13) machined on said threaded portion (8) of the bolt between the lower surface (14) of the head (7) and the threaded part (8) of the bolt, and wherein said central body (1) has a lower surface (16) and said upper annular gasket (11) is compressed and sealed between said annular seat (10), said upper surface (9) of said head (7) of said bolt and said lower surface (16) of said central body (1) by forming the enlarged portion of said tube (4) with a drawing die.

2. The joint according to claim 1, wherein the two tubes (3, 4) have their longitudinal axes at right angles to each other.

3. The mobile joint according to claim 2, wherein said lower gasket (12) when assembled, remains in its position of pre-assembly in said annular groove (13) compressed between said lower surface (14) of said head (7) and the threaded portion (8) of the bolt.

4. The mobile joint according to claim 3, wherein said annular gaskets (11, 12) have a circular section and are made of a plastic material.

* * * * *